(12) United States Patent
Wang et al.

(10) Patent No.: US 8,948,077 B2
(45) Date of Patent: Feb. 3, 2015

(54) METHOD AND APPARATUS FOR MANAGING INTERFERENCE HANDLING OVERHEAD

(75) Inventors: Haiming Wang, Beijing (CN); Jing Han, Beijing (CN); Zixiong Chen, Beijing (CN); Erlin Zeng, Beijing (CN)

(73) Assignee: Nokia Corporation, Espoo (FI)

( * ) Notice: Subject to any disclaimer, the term of this patent is extended or adjusted under 35 U.S.C. 154(b) by 63 days.

(21) Appl. No.: 13/390,513

(22) PCT Filed: Aug. 16, 2010

(86) PCT No.: PCT/FI2010/050634
§ 371 (c)(1),
(2), (4) Date: Apr. 20, 2012

(87) PCT Pub. No.: WO2011/018557
PCT Pub. Date: Feb. 17, 2011

(65) Prior Publication Data
US 2012/0207079 A1    Aug. 16, 2012

Related U.S. Application Data

(60) Provisional application No. 61/233,998, filed on Aug. 14, 2009.

(51) Int. Cl.
*H04B 7/14* (2006.01)
*H04W 28/26* (2009.01)
(Continued)

(52) U.S. Cl.
CPC ............. *H04W 28/26* (2013.01); *H04B 7/2606* (2013.01); *H04W 84/047* (2013.01); *H04B 7/15528* (2013.01)
USPC ........... 370/315; 370/328; 370/252; 370/330; 370/341; 370/347

(58) Field of Classification Search
CPC ..................................................... H04B 7/2606
USPC .......... 370/328, 252, 315, 330, 331, 341, 347
See application file for complete search history.

(56) References Cited

U.S. PATENT DOCUMENTS 7,565,152 B2    7/2009  Gandhi et al.
7,636,334 B2 *  12/2009 Gerlach ........................ 370/330
(Continued)

FOREIGN PATENT DOCUMENTS

EP    1773091 A2    4/2007
EP    1912450 A2    4/2008
(Continued)

OTHER PUBLICATIONS

Ericsson, "Text Proposal on Type 1 Relaying", TSG-RAN WG1 Meeting #56, R1-091112, Agenda Item: 12.2, Athens, Greece, Feb. 9-13, 2009, 2 pages.
(Continued)

*Primary Examiner* — Andrew Lai
*Assistant Examiner* — Andrew C Lee
(74) *Attorney, Agent, or Firm* — Alston & Bird LLP

(57) ABSTRACT

Various methods for managing interference handling overhead are provided. One example method includes generating interference overload indication information and causing the interference overload information to be transmitted on a broadcast channel for relay nodes, wherein the transmission via the broadcast channel indicates that the interference overload indication information is for a donor cell. Similar and related example methods and example apparatuses are also provided. Additional example methods and apparatuses are also provided.

15 Claims, 10 Drawing Sheets

(51) Int. Cl.
*H04B 7/26* (2006.01)
*H04W 84/04* (2009.01)
*H04B 7/155* (2006.01)

(56) References Cited

U.S. PATENT DOCUMENTS

| | | | |
|---|---|---|---|
| 7,853,204 B2* | 12/2010 | Tan et al. | 455/13.1 |
| 7,944,879 B2* | 5/2011 | Choi et al. | 370/329 |
| 7,962,091 B2* | 6/2011 | Oyman et al. | 455/7 |
| 8,014,338 B2* | 9/2011 | Lee et al. | 370/324 |
| 8,040,904 B2* | 10/2011 | Cai et al. | 370/401 |
| 8,175,064 B2* | 5/2012 | Tan et al. | 370/335 |
| 8,175,520 B2* | 5/2012 | Hart | 455/7 |
| 8,335,466 B2* | 12/2012 | Cai et al. | 455/7 |
| 8,355,388 B2* | 1/2013 | Womack et al. | 370/338 |
| 8,451,792 B2* | 5/2013 | Tanno et al. | 370/330 |
| 8,472,968 B1* | 6/2013 | Kim | 455/452.2 |
| 8,521,206 B2* | 8/2013 | Borran et al. | 455/522 |
| 2006/0068849 A1* | 3/2006 | Bernhard et al. | 455/562.1 |
| 2007/0033618 A1* | 2/2007 | Kiukkonen et al. | 725/62 |
| 2007/0105561 A1* | 5/2007 | Doetsch et al. | 455/450 |
| 2008/0013480 A1 | 1/2008 | Kapoor et al. | |
| 2008/0070510 A1* | 3/2008 | Doppler et al. | 455/69 |
| 2008/0081564 A1* | 4/2008 | Rao | 455/63.1 |
| 2008/0084892 A1 | 4/2008 | Sheen et al. | |
| 2008/0253300 A1* | 10/2008 | Wakabayashi et al. | 370/252 |
| 2008/0261645 A1* | 10/2008 | Luo et al. | 455/522 |
| 2009/0109939 A1* | 4/2009 | Bhushan et al. | 370/337 |
| 2009/0176500 A1* | 7/2009 | Panico et al. | 455/446 |
| 2009/0179755 A1* | 7/2009 | Bachl et al. | 340/540 |
| 2009/0197629 A1 | 8/2009 | Borran et al. | |
| 2009/0247181 A1* | 10/2009 | Palanki et al. | 455/452.2 |
| 2009/0264077 A1* | 10/2009 | Damnjanovic | 455/63.1 |
| 2009/0270027 A1* | 10/2009 | O'Neill | 455/15 |
| 2009/0286563 A1* | 11/2009 | Ji et al. | 455/501 |
| 2010/0008294 A1* | 1/2010 | Palanki et al. | 370/328 |
| 2010/0034135 A1* | 2/2010 | Kim et al. | 370/315 |
| 2010/0099449 A1* | 4/2010 | Borran et al. | 455/501 |
| 2010/0150103 A1* | 6/2010 | Womack et al. | 370/331 |
| 2010/0159935 A1* | 6/2010 | Cai et al. | 455/450 |
| 2010/0177672 A1 | 7/2010 | Dayal et al. | |
| 2010/0182903 A1 | 7/2010 | Palanki et al. | |
| 2010/0190447 A1* | 7/2010 | Agrawal et al. | 455/63.1 |
| 2010/0214972 A1* | 8/2010 | Che et al. | 370/315 |
| 2010/0226327 A1 | 9/2010 | Zhang et al. | |
| 2010/0238845 A1* | 9/2010 | Love et al. | 370/280 |
| 2010/0309854 A1* | 12/2010 | Wu et al. | 370/329 |
| 2011/0002314 A1* | 1/2011 | Choi et al. | 370/338 |
| 2011/0034175 A1* | 2/2011 | Fong et al. | 455/450 |

FOREIGN PATENT DOCUMENTS

| | | |
|---|---|---|
| EP | 2134019 A1 | 12/2009 |
| GB | 2444996 A | 6/2008 |
| WO | 2008/004806 A1 | 1/2008 |
| WO | 2008/051061 A1 | 5/2008 |
| WO | 2009/099811 A1 | 8/2009 |
| WO | 2010/133106 A1 | 11/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v8.8.0, Mar. 2009, pp. 1-157.

"3rd Generation Partnership Project; Technical Specification Group Radio Access Network; Evolved Universal Terrestrial Radio Access Network (E-UTRAN); X2 application protocol (X2AP) (Release 8)", 3GPP TS 36.423, v8.5.0, Mar. 2009, pp. 1-100.

International Search Report and Written Opinion received for corresponding Patent Cooperation Treaty Application No. PCT/FI2010/050634, dated Feb. 10, 2011, 25 pages.

Office Action for Chinese Application No. 201080046244.3 dated Jun. 13, 2014.

Office Action for Chinese Application No. 201080046244.3 dated Nov. 24, 2014.

\* cited by examiner

US 8,948,077 B2

METHOD AND APPARATUS FOR MANAGING INTERFERENCE HANDLING OVERHEAD

RELATED APPLICATION

This application is the National Stage Entry of International Application No.PCT/FI2010/050634 filed Aug. 16, 2013, which claims benefit to U.S. Provisional Patent Application No. 61/233,998, filed Aug. 14, 2009.

TECHNICAL FIELD

Embodiments of the present invention relate generally to communications management, and, more particularly, relate to a method and apparatus for managing interference handling overhead.

BACKGROUND

The modern communications era has brought about a tremendous expansion of wireless networks. Various types of networking technologies have been developed resulting in unprecedented expansion of computing networks, telephony networks, and the like, fueled by consumer demand. Wireless and mobile networking technologies have addressed related consumer demands, while providing more flexibility and immediacy of information transfer.

As users become increasingly dependant upon wireless networks for business and personal needs, the desire for faster and more widely accessible wireless communications increases. In some instances, wireless networks may employ various techniques, such as hardware or software solutions, to increase the bandwidth and transfer rates of the wireless network and to increase coverage of wireless networks. One technique involves the relaying of communications between access points to increase the transfer rates and the coverage provided by a wireless communications system.

BRIEF SUMMARY

Various methods, apparatuses, and computer program products are provided for managing interference handling overhead, particularly involving relay nodes. In this regard, example embodiments of the present invention facilitate interference related signaling reductions on a backhaul interface maintained between a donor cell and a subordinate relay node. According to some example embodiments, load information messages including an uplink high interference indication information element or a interference overload indication information element are utilized with various techniques, such as grouping, content-based resource allocation, and others, to reduce the signaling overhead associated with interference handling and management and provide other benefits.

An example method comprises generating interference overload indication information and causing the interference overload information to be transmitted on a broadcast channel for relay nodes, wherein the transmission via the broadcast channel indicates that the interference overload indication information is for a donor cell. An example apparatus comprises at least one processor and at least one memory including computer program code, the at least one memory and the computer program code configured to, with the at least one processor, direct the apparatus at least to perform generating interference overload indication information and causing the interference overload indication information to be transmitted on a broadcast channel for relay nodes, wherein the transmission via the broadcast channel indicates that the interference overload indication information is for a donor cell. A computer program product comprises at least one computer-readable storage medium having executable computer-readable program code instructions stored therein, the computer-readable program code instructions configured to direct an apparatus at least to perform generating interference overload indication information and causing the interference overload information to be transmitted on a broadcast channel for relay nodes, wherein the transmission via the broadcast channel indicates that the interference overload indication information is for a donor cell. An example apparatus comprises means for generating interference overload indication information and means for causing the interference overload information to be transmitted on a broadcast channel for relay nodes, wherein the transmission via the broadcast channel indicates that the interference overload indication information is for a donor cell.

An example method comprises generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes. An example apparatus comprises at least one processor and at least one memory including computer program code, the at least one memory and the computer program code configured to, with the at least one processor, direct the apparatus at least to perform generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes. A computer program product comprises at least one computer-readable storage medium having executable computer-readable program code instructions stored therein, the computer-readable program code instructions configured to direct an apparatus at least to perform generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes. An example apparatus comprises means for generating or receiving uplink high interference indication information, means for classifying subordinate relay nodes into groups, means for compressing the uplink high interference indication information associated with members of one of the groups, and means for causing the compressed uplink high interference indication information to be transmitted on a broadcast channel for relay nodes.

An example method comprises reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources. An example apparatus comprises at least one processor and at least one memory including computer program code, the at least one memory and the computer program code configured to, with the at least one processor, direct the apparatus at least to perform reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources. A computer program product comprises at least one computer-readable storage medium having executable computer-readable program code instructions stored therein, the computer-readable program code instructions configured to direct an apparatus at least to perform reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources. An example apparatus comprises means for reserving resources for uplink high interference indication information or interference overload indication information transmissions, the reserved resources being allocated for use by a plurality of subordinate relay nodes without any one subordinate relay node being individually allocated the reserved resources, means for causing the subordinate relay nodes to be notified of the reserved resources, and means for receiving a transmission including uplink high interference indication information or interference overload indication information from at least one of the subordinate relay nodes via the reserved resources.

An example method comprises receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources. An example apparatus comprises at least one processor and at least one memory including computer program code, the at least one memory and the computer program code configured to, with the at least one processor, direct the apparatus at least to perform receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources. A computer program product comprises at least one computer-readable storage medium having executable computer-readable program code instructions stored therein, the computer-readable program code instructions configured to direct an apparatus at least to perform receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources. An example apparatus comprises means for receiving a notification of resources reserved for uplink high interference indication information or interference overload indication information transmissions, the reserved resources being allocated for use by a plurality of subordinate relay nodes without any one subordinate relay node being individually allocated the reserved resources, and means for causing the transmission of uplink high interference indication information or interference overload indication information via at least one of the reserved resources.

An example method comprises receiving a transmitted change indicator from a relay node, the change indicator being one of a plurality of change indicators that are provided by the relay node, the received change indicator including information representing a degree of change in uplink high interference indication information or interference overload indication information for physical resource blocks associated with a relay node, allocating resources to the relay node when the information included in the received change indicator exceeds a threshold, and receiving uplink high interference indication information or interference overload indication information from the relay node via the allocated resources. An example apparatus comprises at least one processor and at least one memory including computer program code, the at least one memory and the computer program code configured to, with the at least one processor, direct the apparatus at least to perform receiving a transmitted change indicator from a relay node, the change indicator being one of a plurality of change indicators that are provided by the relay node, the received change indicator including information representing a degree of change in uplink high interference indication information or interference overload indication information for physical resource blocks associated with a relay node, allocating resources to the relay node when the information included in the received change indicator exceeds a threshold, and receiving uplink high interference indication information or interference overload indication information from the relay node via the allocated resources. A computer program product comprises at least one computer-readable storage medium having executable computer-readable program code instructions stored therein, the computer-readable program code instructions configured to direct an apparatus at least to perform receiving a transmitted change indicator from a relay node, the change indicator being one of a plurality of change indicators that are provided by the relay node, the received change indicator including information representing a degree of change in uplink high interference indication information or interference overload indication information for physical resource blocks associated with a relay node, allocating resources to the relay node when the information included in the received change indicator exceeds a threshold, and receiving uplink high interference indication information or interference overload indication information from the relay node via the allocated resources. An example apparatus comprises means for receiving a transmitted change indicator from a relay node, the change indicator being one of a plurality of change indicators that are provided by the relay node, the received change indicator including information representing a degree of change in uplink high interference indication information or interference overload indication information for physical resource blocks associated with a relay node, means for allocating resources to the relay node when the information included in the received change indicator exceeds a threshold, and means for receiving uplink high interference indication information or interference overload indication information from the relay node via the allocated resources.

An example method comprises causing transmission of a change indicator, the change indicator being one of a plurality of change indicators provided by a relay node, the change indicator including information representing a degree of change in uplink high interference indication information or interference overload indication information for physical resource blocks associated with a relay node, receiving a notification of allocated resources in response to the information included in the change indicator having exceeded a threshold, and causing transmission of uplink high interference indication information or interference overload indication information via the allocated resources. An example apparatus comprises at least one processor and at least one memory including computer program code, the at least one memory and the computer program code configured to, with the at least one processor, direct the apparatus at least to perform causing transmission of a change indicator, the change indicator being one of a plurality of change indicators provided by a relay node, the change indicator including information representing a degree of change in uplink high interference indication information or interference overload indication information for physical resource blocks associated with a relay node, receiving a notification of allocated resources in response to the information included in the change indicator having exceeded a threshold, and causing transmission of uplink high interference indication information or interference overload indication information via the allocated resources. A computer program product comprises at least one computer-readable storage medium having executable computer-readable program code instructions stored therein, the computer-readable program code instructions configured to direct an apparatus at least to perform causing transmission of a change indicator, the change indicator being one of a plurality of change indicators provided by a relay node, the change indicator including information representing a degree of change in uplink high interference indication information or interference overload indication information for physical resource blocks associated with a relay node, receiving a notification of allocated resources in response to the information included in the change indicator having exceeded a threshold, and causing transmission of uplink high interference indication information or interference overload indication information via the allocated resources. An example apparatus comprises means for causing transmission of a change indicator, the change indicator being one of a plurality of change indicators provided by a relay node, the change indicator including information representing a degree of change in uplink high interference indication information or interference overload indication information for physical resource blocks associated with a relay node, means for receiving a notification of allocated resources in response to the information included in the change indicator having exceeded a threshold, and means for causing transmission of uplink high interference indication information or interference overload indication information via the allocated resources.

An example method comprises causing the transmission of uplink high interference indication information on a first link, the first link being one of a downlink backhaul link or an uplink backhaul link, and causing the transmission of interference overload indication information on a second link, the second link being the downlink backhaul link when the first link is the uplink backhaul link or the second link being the uplink backhaul link when the first link is the downlink backhaul link. An example apparatus comprises at least one processor and at least one memory including computer program code, the at least one memory and the computer program code configured to, with the at least one processor, direct the apparatus at least to perform causing the transmission of uplink high interference indication information on a first link, the first link being one of a downlink backhaul link or an uplink backhaul link, and causing the transmission of interference overload indication information on a second link, the second link being the downlink backhaul link when the first link is the uplink backhaul link or the second link being the uplink backhaul link when the first link is the downlink backhaul link. A computer program product comprises at least one computer-readable storage medium having executable computer-readable program code instructions stored therein, the computer-readable program code instructions configured to direct an apparatus at least to perform causing the transmission of uplink high interference indication information on a first link, the first link being one of a downlink backhaul link or an uplink backhaul link, and causing the transmission of interference overload indication information on a second link, the second link being the downlink backhaul link when the first link is the uplink backhaul link or the second link being the uplink backhaul link when the first link is the downlink backhaul link. An example apparatus comprises means for causing the transmission of uplink high interference indication information on a first link, the first link being one of a downlink backhaul link or an uplink backhaul link, and means for causing the transmission of interference overload indication information on a second link, the second link being the downlink backhaul link when the first link is the uplink backhaul link or the second link being the uplink backhaul link when the first link is the downlink backhaul link.

An example method comprises generating a message including uplink high interference indication information or interference overload indication information, the message including an indication of, or otherwise indicating, a component carrier associated with the uplink high interference indication information or interference overload indication information, and causing transmission of the generated message. An example apparatus comprises at least one processor and at least one memory including computer program code, the at least one memory and the computer program code configured to, with the at least one processor, direct the apparatus at least to perform generating a message including uplink high interference indication information or interference overload indication information, the message including an indication of, or otherwise indicating, a component carrier associated with the uplink high interference indication information or interference overload indication information, and causing transmission of the generated message. A computer program product comprises at least one computer-readable storage medium having executable computer-readable program code instructions stored therein, the computer-readable program code instructions configured to direct an apparatus at least to perform generating a message including uplink high interference indication information or interference overload indication information, the message including an indication of, or otherwise indicating, a component carrier associated with the uplink high interference indication information or interference overload indication information, and causing transmission of the generated message. An example apparatus comprises means for generating a message including uplink high interference indication information or interference overload indication information, the message including an indication of, or otherwise indicating, a component carrier associated with the uplink high interference indication information or interference overload indication information, and means for causing transmission of the generated message.

An example method comprises receiving an indication of sub-frames dedicated for uplink backhaul transmissions by a relay node; and causing transmissions by the relay node within the dedicated sub-frames. An example apparatus comprises at least one processor and at least one memory including computer program code, the at least one memory and the computer program code configured to, with the at least one processor, direct the apparatus at least to perform receiving an indication of sub-frames dedicated for uplink backhaul transmissions by a relay node; and causing transmissions by the relay node within the dedicated sub-frames. A computer program product comprises at least one computer-readable storage medium having executable computer-readable program code instructions stored therein, the computer-readable program code instructions configured to direct an apparatus at least to perform receiving an indication of sub-frames dedicated for uplink backhaul transmissions by a relay node; and causing transmissions by the relay node within the dedicated sub-frames. An example method comprises means for receiving an indication of sub-frames dedicated for uplink backhaul transmissions by a relay node; and means for causing transmissions by the relay node within the dedicated sub-frames.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
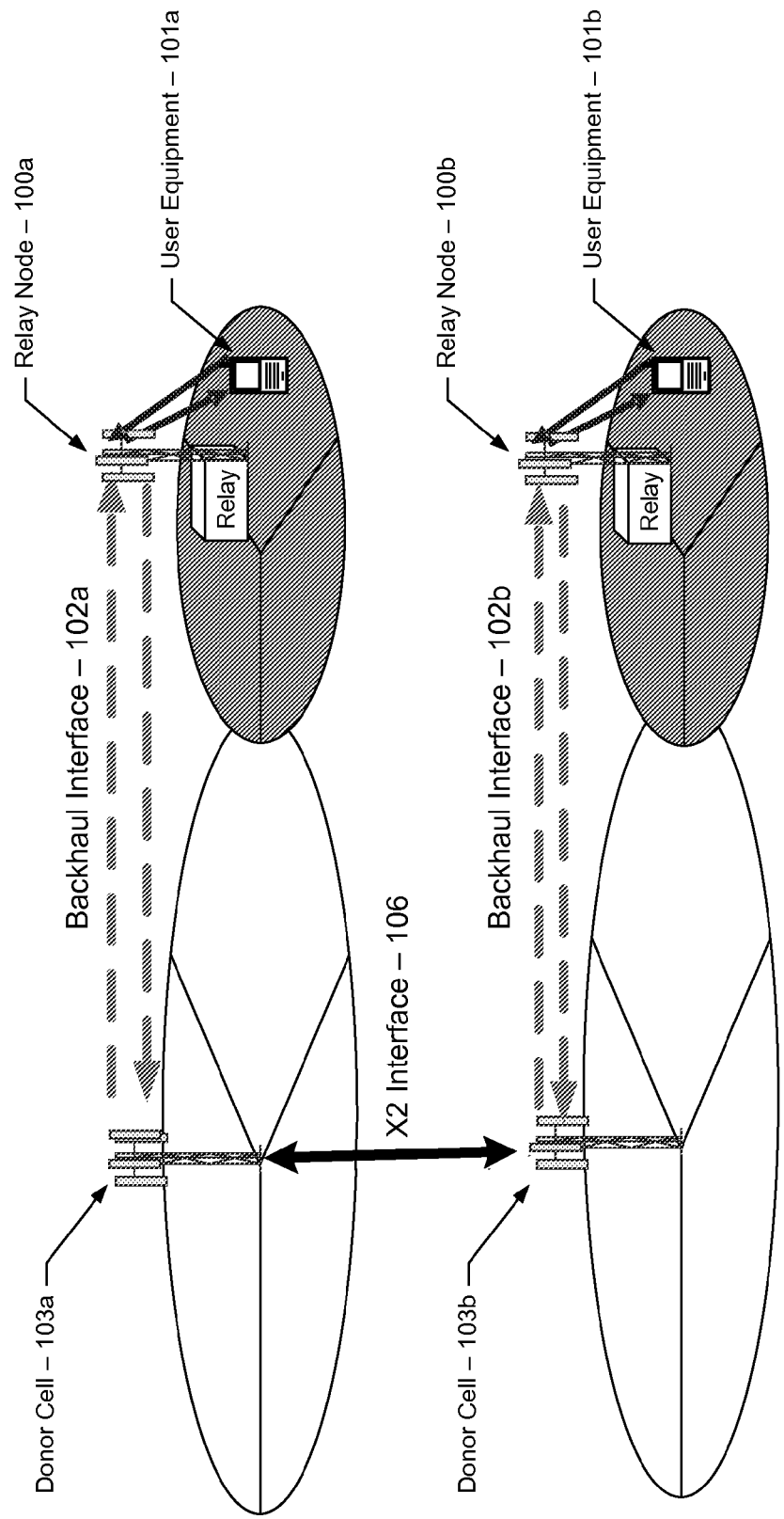
FIG. 1 illustrates a relay system including two donor cells according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored. Further, the term "cell" used without a modifier herein may refer to both donor cells and/or relay nodes.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 depicts a communications system including layer 3 (L3) relay nodes (RNs) 100 (e.g., relay node 100a and relay node 100b), also referred to as relay cells, with backhauling. In some example embodiments, the communications system of FIG. 1 may employ time division duplexing (TDD), where the system may be an Evolved Universal Terrestrial Access Network (EUTRAN) or Long Term Evolution-Advanced (LTE-A) system. The communications system of FIG. 1 may include any number of EUTRAN node Bs (eNBs), which may provide an Evolved Universal Terrestrial Access (EUTRA) user plane (e.g., packet data convergence protocol (PDCP), radio link control (RLC), medium access control (MAC), physical (layer 1) (PHY), or the like) and control plane (e.g., radio resource control (RRC)) protocol terminations towards a user equipment (UE) 101. The eNBs that support and control one or more relay nodes 100, may be referred to as donor cells 103 (e.g., donor cell 103a and donor cell 103b). To support a relay node 100, donor cell 103 may establish a backhaul interface 102 (e.g., backhaul interface 102a and backhaul interface 102b), also referred to as a wireless "Un" interface, with a respective relay node 100. The backhaul interface 102 may include a downlink (DL) backhaul link and an uplink (UL) backhaul link between the donor cell 103 and a relay node 100. The donor cell 103 and relay node 100 may implement wireless inband relaying in accordance with, for example, "Type I" relaying as described in "Text Proposal for Type 1 Relaying," R1-091112 by Ericsson, which is incorporated herein by reference in its entirety. A donor cell 103, which may have a unique physical-layer cell identifier, may directly support the communications needs of a UE 101 (e.g., UE 101a and UE 101b), or a relay node may directly support the communications needs of a UE 101. In a situation where a relay node 100 supports the communications needs of a UE 101 (as depicted in FIG. 1), the donor cell 103 provides a connection to the network for both the UE 101 and the relay node 100, via the backhaul interface 102. A UE 101 that is directly supported by a donor cell 103 may be referred to as a macro-UE, while a UE 101 that is supported by a relay node 100 may be referred to as an RN-UE.

The donor cells 103 may be interconnected with each other by means of an interface, referred to as the X2 interface 106. The X2 interface is often a wired interface, but wireless X2 interfaces may also be implemented.

According to FIG. 1, the donor cells 103 and relay nodes 100 may employ a relaying technique for backhauling to, in some example embodiments, extend coverage and improve capacity relative to an eNB that is not associated with a relay node 100. As mentioned above, the relay node 100 may be party to a backhaul interface 102 with a respective donor cell 103. The backhaul interface 102 may support the communications, and the communications overhead, associated with UEs 101 attempting to connect and communicate with the network via a relay node 100.

The relay node 100 node may also be an eNB supporting one or more cells or sectors. The relay node 100 may be accessible to UEs 101, and may provide DL common and shared control signaling, (e.g., primary synchronization channel (P-SCH), secondary synchronization channel (S-SCH), physical broadcast channel (P-BCH), common reference signal (CRS)), to allow UEs 101 to access the relay node 100. The relay node 100 may be wirelessly connected to the rest of the radio access network (RAN) via donor cell 103, which may provide a larger coverage area. Via the backhaul interface 102, a backhauling technique is employed that may use inband or outband resources. Some example embodiments of the present invention consider the utilization of inband resources in a self-backhauling technique. By employing a backhauling technique, flexibility is brought to the system. However, particularly as the number of UEs 101 connected to a relay node 100 increases, the communications, and the communications overhead, supported by the backhaul interface may increase and the backhaul interface 102 may become congested and slow. Accordingly, the quality of service to the UEs 101 supported by the backhaul interface 102 may suffer. It is therefore advantageous to minimize the utilization of the backhaul interface's resources, so that the resources may be available to maintain or improve the quality of UE communications.

Figure 2:
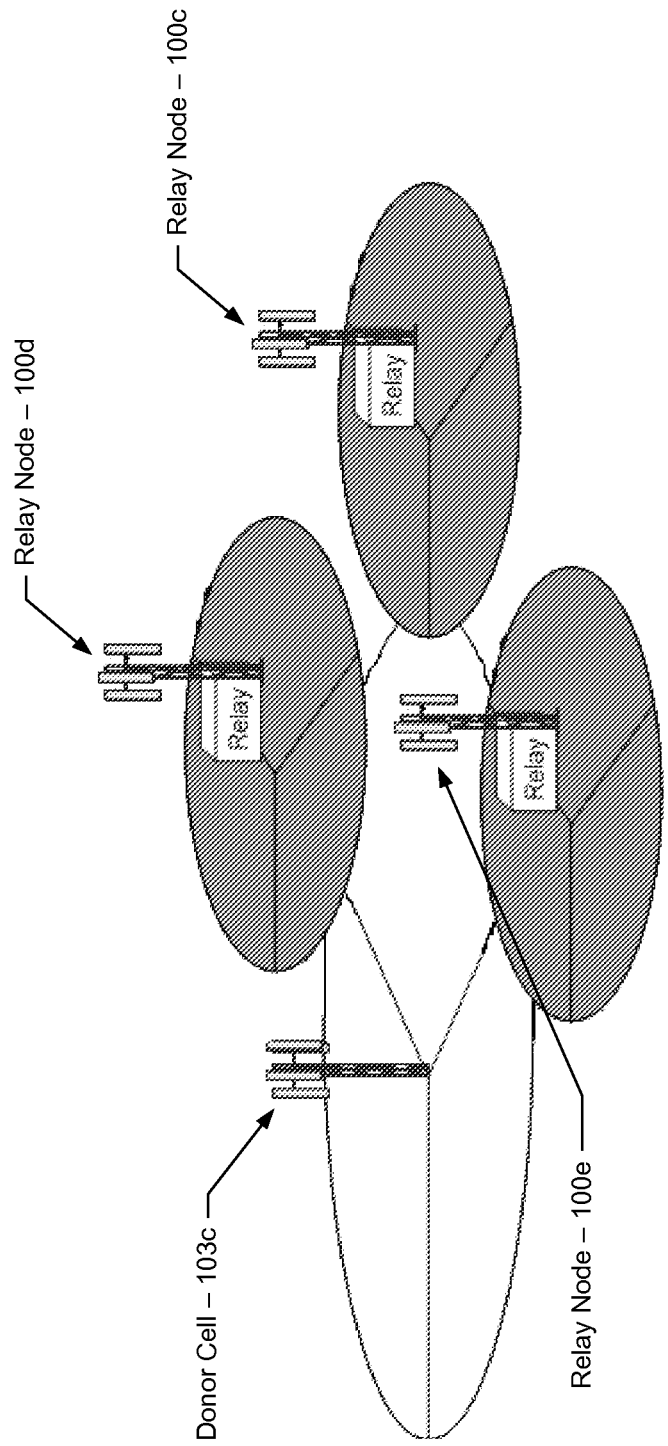
FIG. 2 illustrates a relay system including one donor cell and three subordinate relay nodes according to an example embodiment of the present invention.

FIG. 1 depicts a network configuration where two donor cells 103 with respective relay nodes 100 are depicted. However, a donor cell 103 may support any number of relay nodes 100. FIG. 2 depicts an example where a donor cell 103c supports three relay nodes 100c, 100d, and 100e. For each of the relay nodes 100, a respective backhaul interface 102 may be established with the donor cell 103c.

The relaying implemented in the systems of FIGS. 1 and 2 can lead to inter-cell interference due to, for example, the overlapping of coverage between cells (referring to the coverage provided by both donor cells 103 and relay cells 100). To manage inter-cell interference, an inter-cell interference coordination (ICIC) technique may be implemented to limit interference to a reasonable level. Some inter-cell interference coordination techniques employ messaging between the cells to manage the interference. For example, an inter-cell interference coordination technique may utilize information regarding the loading or expected loading of various cells to be shared amongst the cells. In this regard, a load indication procedure may be implemented by the cells that includes the use of a load information message, such as the "LOAD INFORMATION" message defined in "$3^{rd}$ Generation Partnership Project; Technical Specification Terrestrial Radio Access Network (E-UTRAN); X2 Application Protocol (X2AP)," 3GPP TS 36.423 v8.5.0, 2009, which is hereby incorporated by reference in its entirety.

A load information message may include two or more information elements (IEs) defined within the load information message. A first information element is an interference overload indication (OI). An OI may indicate, possibly on a per physical resource block (PRB) basis, the interference level experienced by the sending donor cell 103 or relay node 100. A source cell identifier, such as the unique physical-layer cell identifier for a donor cell or a relay node, may be transmitted with the OI information to indicate which cell generated the OI. A second information element of a load information message is an uplink (UL) high interference indication (HII). An HII may indicate, possibly on a per physical resource block basis, the occurrence of high interference sensitivity as perceived by the sending cell. A target cell identifier, such as the unique physical-layer cell identifier for a donor cell or a relay node, may be transmitted together with HII information to indicate the cell for which the corresponding UL HII information is associated.

The load indication procedure and associated messaging may utilize the X2 interface 106 to transmit and receive load information messages between the donor cells 103. Relay nodes 100 and donor cells 103 may utilize the backhaul interface 102 to transmit and receive load information messages. Utilization of the backhaul interface 102 for inter-cell interference coordination messaging with load information messages may consume precious resources and limited throughput of the backhaul interface 102, resulting in a heavy signaling burden on the backhaul interface 102. For example, the donor cell 103 may utilize the backhaul interface 102 to transfer load information messages generated by donor cell 103 to the donor cell 103's subordinate relay nodes. The donor cell 103 may also utilize the backhaul interface 102 to transfer load information messages generated by neighbor donor cells received via X2 interface 106 to subordinate relay nodes. Further, each of the subordinate relay nodes may utilize the backhaul interface 102 to transfer load information messages generated by the relay nodes 100 to the donor cell 103. As such, reducing the impacts of inter-cell interference coordination messaging on the backhaul interface 102 would be advantageous.

The following description provides various example schemes, and associated example apparatuses for implementing the schemes, which may be utilized for reducing or limiting the burden on the backhaul interface with respect to interference related messaging. While the different schemes may be described separately, one of skill in the art would appreciate that aspects and features of each of the schemes may be combined to create hybrid schemes. For example, some example schemes may be implemented via the DL backhaul link, but one of skill in the art would appreciate that a similar UL backhaul link solution could also be employed in accordance with some example embodiments.

In a first example scheme, a donor cell 103 may be configured to transmit OI and/or HII information elements, possibly within a load information message, via a broadcast over a DL backhaul link. In this regard, the first example scheme involves techniques for the donor cell to provide OI and HII information to the donor cell's subordinate relay nodes via the backhaul interface. In some example embodiments, compression of the information within the OI and/or HII may be performed. The broadcast and/or compression of the OI and HII information may be performed in different manners due to the type of information being included in the message as further described below.

As stated above, OI information indicating the inter-cell interference level experienced by the sending cell is included in a message with an identifier of the sending cell. As such, when a donor cell transmits OI information to the donor cell's subordinate relay nodes, the identifier of the sending cell is the same. A relay node control channel of the backhaul interface that is commonly used by the subordinate relay nodes may therefore be used to broadcast the donor cell's OI information, possibly without the inclusion of the donor cell's identifier.

Figure 3B:
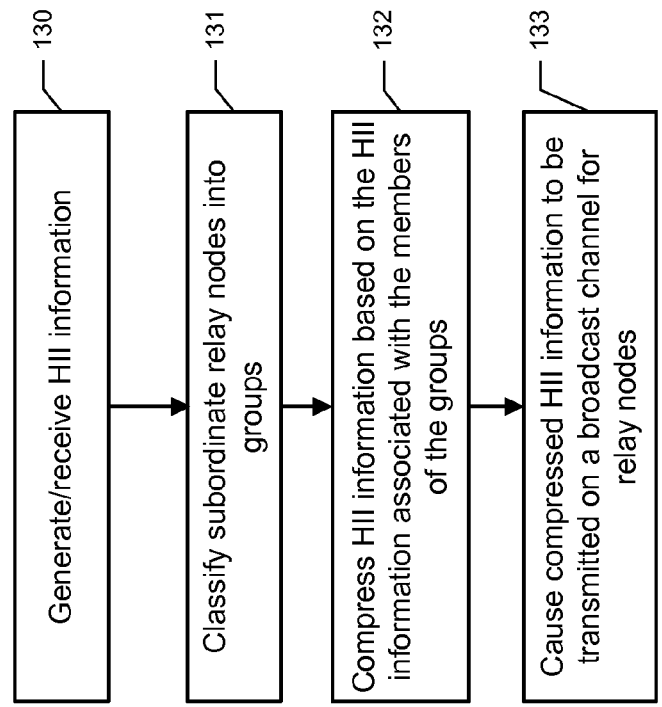
FIGS. 3a and 3b illustrate a flow charts of methods for managing interference handling overhead according to example embodiments of the present invention.
Figure 3A:
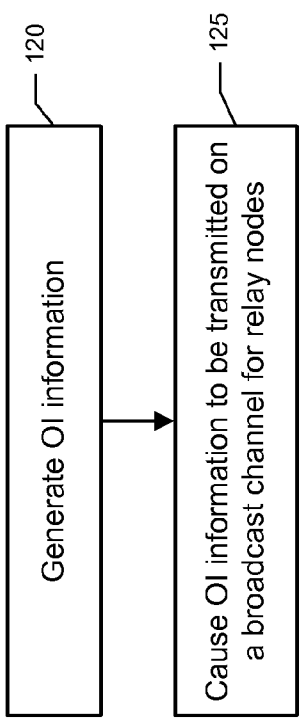

FIG. 3a depicts an example method for handling the OI information as described above. At 120, OI information may be generated, for example, at a donor cell. At 125, the OI information may be transmitted, or caused to be transmitted, on a broadcast channel for relay nodes. The OI information may be prepared and transmitted without an accompanying indication of the source cell for the OI information. The broadcast channel may be a shared or common control channel and/or a predefined DL backhaul link sub-frame may be utilized. For example, the physical broadcasting channel between the donor cell and the relay node (R-PBCH) may be utilized for the broadcast.

For HII information, a different technique may be implemented, since the HII information indicates inter-cell interference expected to affect a target cell and is accompanied by the target cell's identifier. Thus, all HII information provided by the donor cell to the subordinate relay nodes need not have the same cell identifier.

In accordance with some example embodiments, the donor cell may be configured to broadcast HII information over the DL backhaul link. The broadcast may include a compressed message that includes grouped HII information associated with multiple target cell identifiers. In this regard, similar HII information for different target relay nodes may be combined to generate one HII information element of a message. While in accordance with some example embodiments a performance loss may be experienced due to the compression of the information, a reduced quantity of signaling overhead on the backhaul interface is realized.

Compressing and broadcasting the HII information may be performed in a number of ways. For example, as depicted in FIG. 3b, HII information may be generated or received at 130. The subordinate relay nodes may be classified into one or more groups at 131. According to some example embodiments, classification may be performed dynamically based on the received or generated HII information, as described further below. According to some example embodiments, classification may be performed such that the groupings are static or change less frequently, as further described below. At 132, the HII information may be compressed based on the HII information associated with the members of the groups, and, at 133, compressed HII information may be transmitted on a broadcast channel for relay nodes. The broadcast channel may be a shared or common control channel and/or a predefined DL backhaul link sub-frame may be utilized. For example, the physical broadcasting channel between the donor cell and the relay node (R-PBCH) may be utilized for the broadcast.

As mentioned above, the classification of relay nodes may be performed using a dynamic grouping technique. Prior to transmitting HII information, a grouping procedure may be performed, for example by a donor cell, based on the HII information to be transmitted. Target cell identifiers associated with identical HII information may grouped such that only one instance of the identical HII information is included in the message with accompanying target cell identifiers that are associated with the common HII information.

Figure 3C:
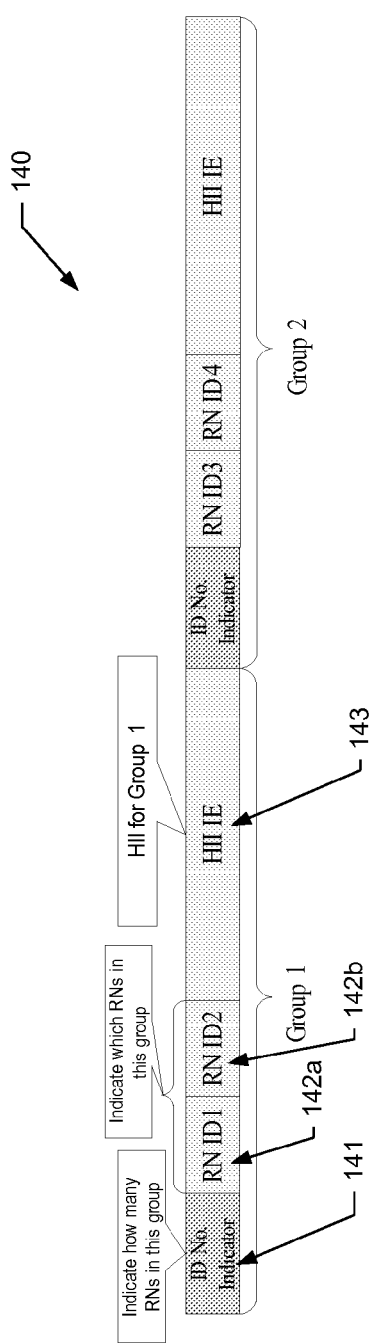
FIG. 3c illustrates a message format with relay node grouping according to an example embodiment of the present invention.

FIG. 3c depicts a message format in accordance with an example embodiment employing dynamic grouping. The example message 140 includes two groups (Group 1 and Group 2). The portion of the message associated with each group includes an Identifier Number (ID No.) Indicator 141, a one or more relay node identifiers (RNIDs) 142 (e.g., RNID1 142a and RNID2 142b), and a group HII information element 143. The ID No. Indicator 141 is configured to indicate the number of RNIDs that follow. According to some example embodiments, rather than include the ID No. indicator 141, a transition indicator may be inserted between the series of RNIDs 142 and the HII information element 143 to indicate the transition point between the fields of the message. Further, other transition indicators may also be included between the RNIDs 142.

An advantage of implementing dynamic grouping as described above is that donor cells can group relay nodes having similar HII information elements into a group, thereby reducing the signaling overhead. However, since the number of groups and the number of RNIDs in a group may change, the length of the message can be dynamic.

An alternative to dynamic grouping as described above may be referred to as semi-persistent grouping. With semi-persistent grouping, subordinate relay nodes may be placed into predefined groups (e.g., the groups may be defined prior to generation or receipt of OI or HII information). The membership of the groups may be defined and changed through the use of radio resource control (RRC) signaling to thereby notify relay nodes of the respective group to which a relay node belongs.

Figure 3D:
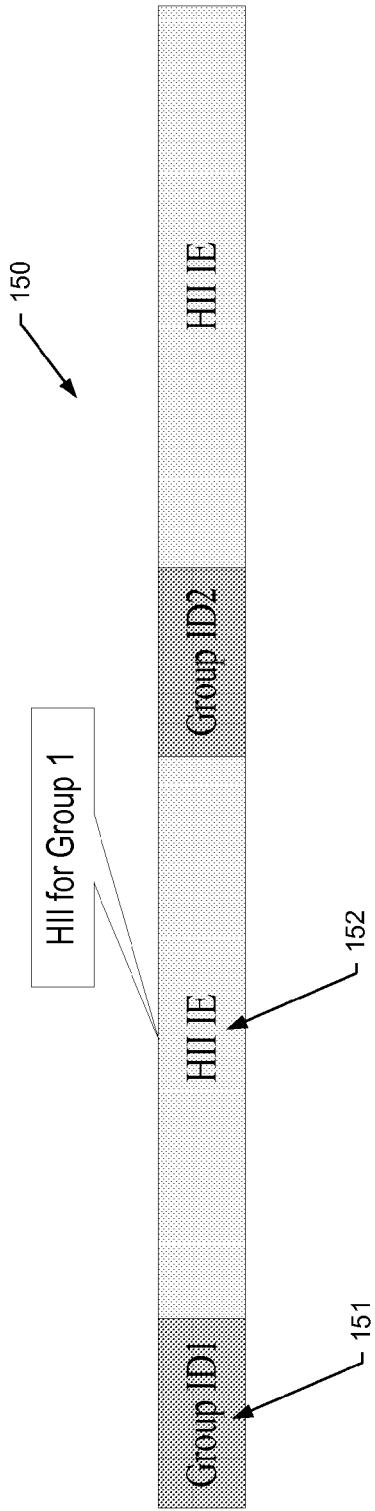
FIG. 3d illustrates another a message format with relay node grouping according to an example embodiment of the present invention.

Since the groups are predefined and the relay nodes are aware of the group to which they belong, the message need not include relay node identifiers. The message may however indicate which group is associated with included HII information. FIG. 3d depicts an example message format 150 for transmitting HII information using semi-persistent grouping. The example message format 150 provides HII information for two predefined groups. A portion of the message associated with a group includes a Group ID 151 and an associated HII information element 152. Compared with dynamic grouping described above, semi-persistent grouping may reduce some signaling overhead. However, since groups are not based on common HII information, another technique may be used compress the HII information.

Figure 3E:
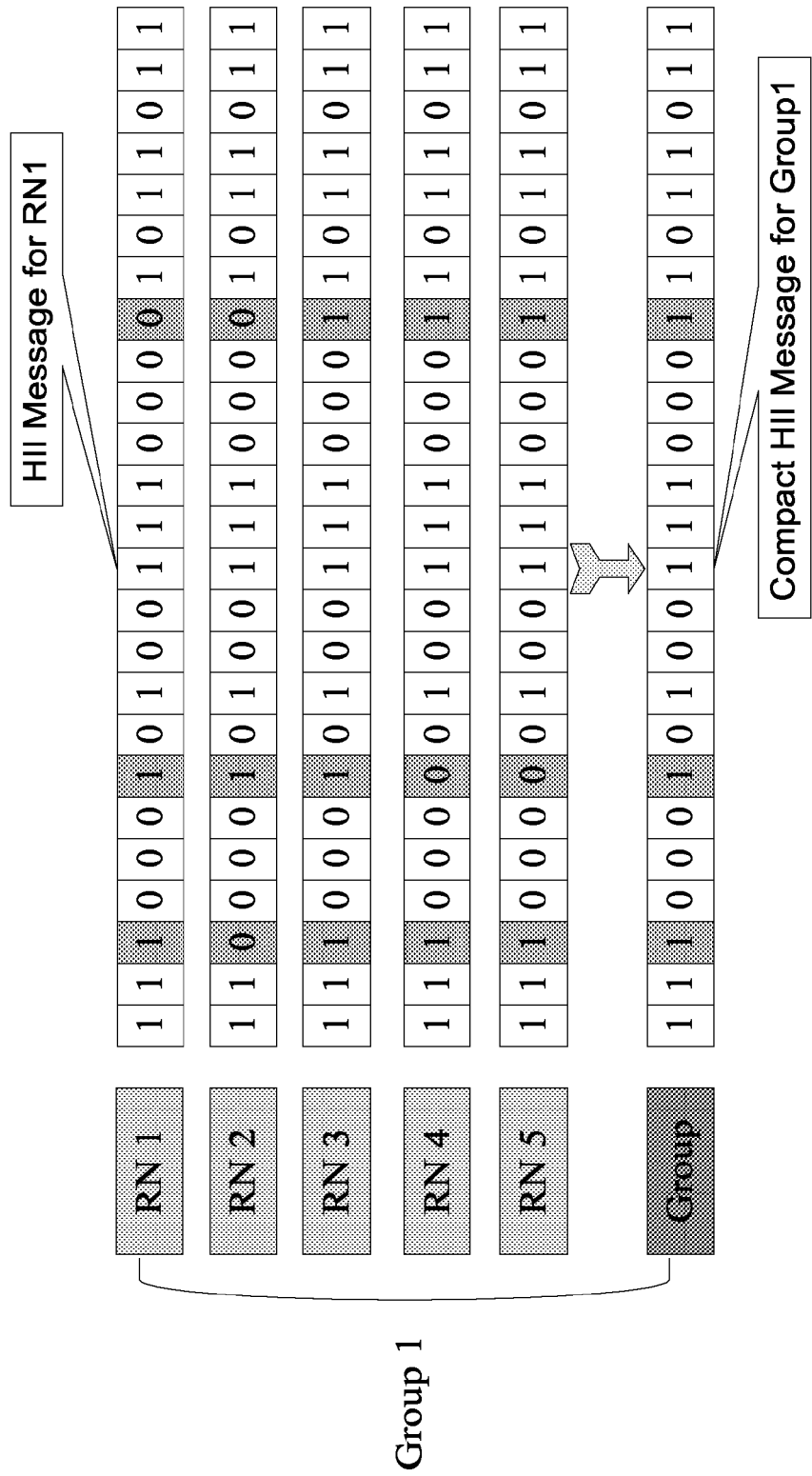
FIG. 3e illustrates an example method for compressing information according to an example embodiment of the present invention.

One example technique for compressing HII information is to implement a majority rule bit determination to generate group HII information. In this regard, the HII information for each relay node within a group may be compared on a bit-by-bit basis, and the value associated with the majority of bits may be used in the group HII information. Additionally, one or more relay nodes may be given a higher or lower priority, and, as a result, the bits of the HII information associated with the high priority relay node may be given preferential treatment. For example, if no majority can be determined, or regardless of whether a majority may be determined, the bit value associated with HII information of the high priority relay node may be used in the group HII information. FIG. 3*e* depicts an example generation of group HII information using a majority rule.

In accordance with an example second scheme, a contention-based OI and HII reporting mechanism may be implemented over a UL backhaul link. The example second scheme addresses techniques for the relay nodes to provide OI and HII information to the donor cell via the backhaul interface.

The transmission of OI and/or HII information originating from the relay nodes may not be regularly generated and transmitted, such as in situations of light load. Accordingly, based on some example embodiments, a contention-based reporting mechanism may be implemented that significantly reduces the signaling overhead on the backhaul interface, particularly when a donor cell supports multiple relay nodes. The contention-based mechanism may involve the donor cell reserving some resources shared by the relay nodes (e.g., UL backhaul link sub-frames) to be used for OI and HII transmission. The relay nodes may be configured to utilize the reserved resources as needed in order to exploit the relative randomness of the OI and HII transmissions. Additionally, techniques, as further described below, may be implemented to reduce the potential for collisions, which occur when more than one relay node attempts to use the same reserved resource.

FIG. 4 illustrates an example method for implementing a contention-based reporting mechanism. At 170, one or more resources or transmission opportunities (e.g., UL resources) for OI and HII information transmissions may be reserved, for example, by the donor cell. At 171, the relay nodes may be notified of the reserved resources, for example via a broadcast from the donor cell. FIG. 4*b* illustrates two reserved resource blocks (e.g., transmission opportunity 1 and transmission opportunity 2) within a UL backhaul sub-frame for use in a contention-based reporting mechanism. At 172, relay nodes may determine whether or not to report OI or HII information. For example, in accordance with some example embodiments, a relay node may monitor and track the number of physical resource block's having an OI or HII that has changed since a prior reporting. If the number of changes is less than a threshold, then the relay node may wait until the threshold is exceeded. When the threshold is exceeded, the relay node may determine that a reporting of either the OI or the HII is needed, and a reserved resource may be selected by the relay node at 174. The relay node may subsequently transmit OI or HII information via the selected resource at 175.

The donor cell may receive a transmission at 176 and determine whether OI or HII information was successfully received at 179. If OI or HII information was not successfully received (e.g., due to a collision resulting from two relay nodes selecting the same resource), no acknowledgement will be transmitted by the donor cell at 181. If the OI or HII information is successfully received, the donor cell may transmit an acknowledgement at 180. The acknowledgement may indicate which relay node's IO or HII information has been successfully received. Further, the acknowledgement may be transmitted in the next or a subsequent DL backhaul sub-frame, for example, via a dedicated feedback channel.

Upon transmitting OI or HII information at 175, the relay node may wait for an acknowledgment at 177 and 178. If an acknowledgement is received, the selected resource may be released by the relay node at 184. If no acknowledgement is received by a threshold time, a new reserved resource may be selected at 182 and the previously selected resource may be released. According to some example embodiments, rather than selecting a new reserved resource at 182, the reserved resource selected at 174 may be reused. However, selection of a new resource may have the affect of increasing the randomness of the utilized resource thereby decreasing the likelihood of a collision. Having not received an acknowledgement, the relay node may retransmit the OI or HII information at 183, either on a newly selected or previously selected reserved resource. Upon receipt of the retransmission, the donor cell may again determine whether the OI or HII information was received successfully at 179.

According to some example embodiments, implementation of a content-based mechanism results in a number of advantages with regard to reducing the overhead associated with interference messaging. In this regard, according to some example embodiments, the donor cell need not reserve dedicated resources for each relay node to report OI and/or HII, thereby resulting in improved resource utilization efficiency. Also, in accordance with some embodiments, the relay node need not request extra or additional resources for HII and/or OI transmission, and as a result, a message may be transmitted in the first upcoming UL backhaul sub-frame without delay. Further, in accordance with some example embodiments, the relay node reports OI and/or HII information even when no resource is allocated to data backhaul transmission.

However, as mentioned above, collisions may result in a contention-based mechanism when more than one relay node selects the same reserved resource to be used for transmission of OI or HII information. When collisions occur, the donor cell may be unable to decode the received transmission. A number of techniques may be utilized to reduce the likelihood of collisions. For example, according to some example embodiments, sub-band OI and HII reporting may be implemented to reduce collisions.

Figure 4A:
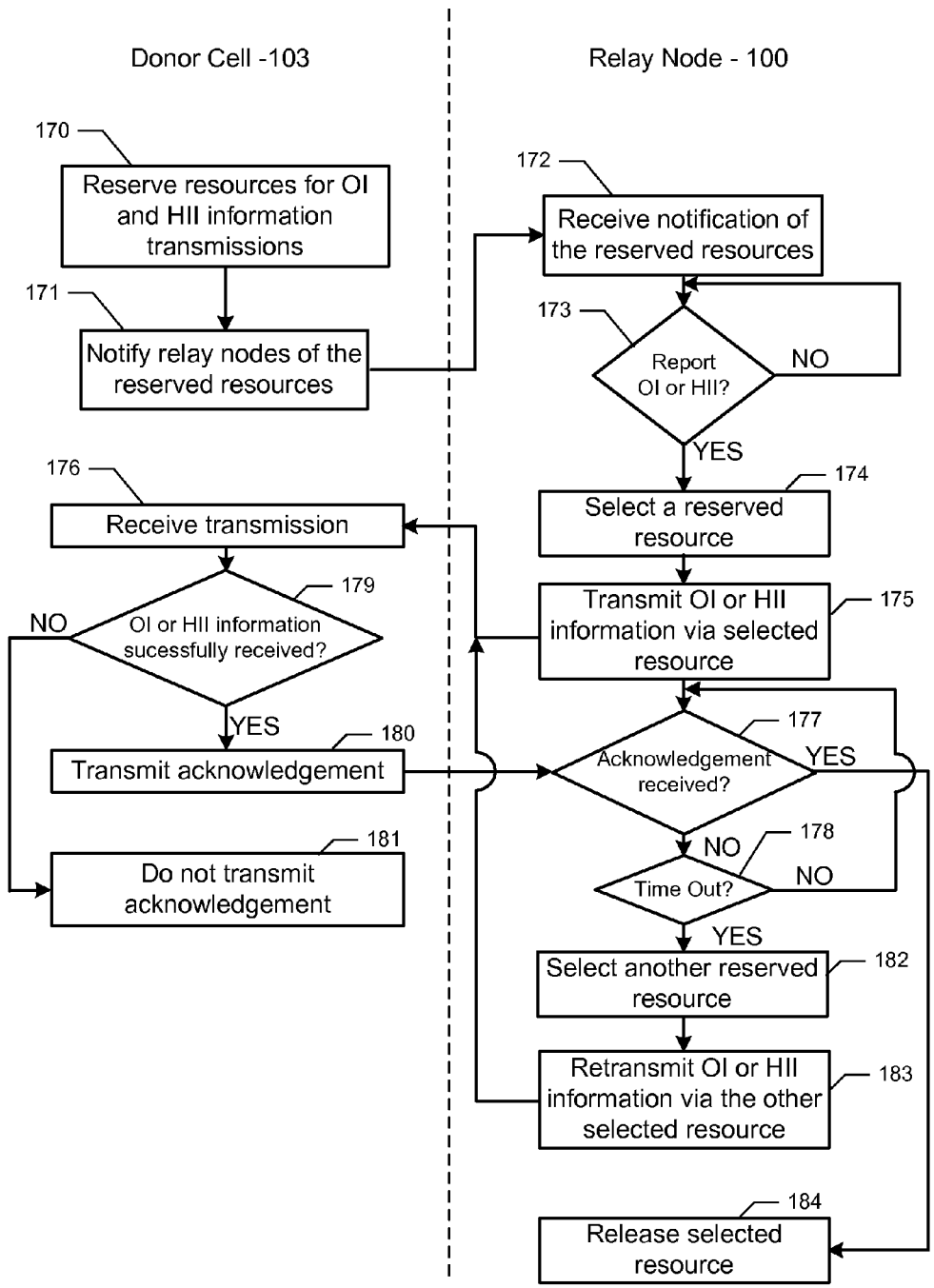
FIG. 4a illustrates a flow chart of a method for managing interference handling overhead according to an example embodiment of the present invention.
Figure 4B:
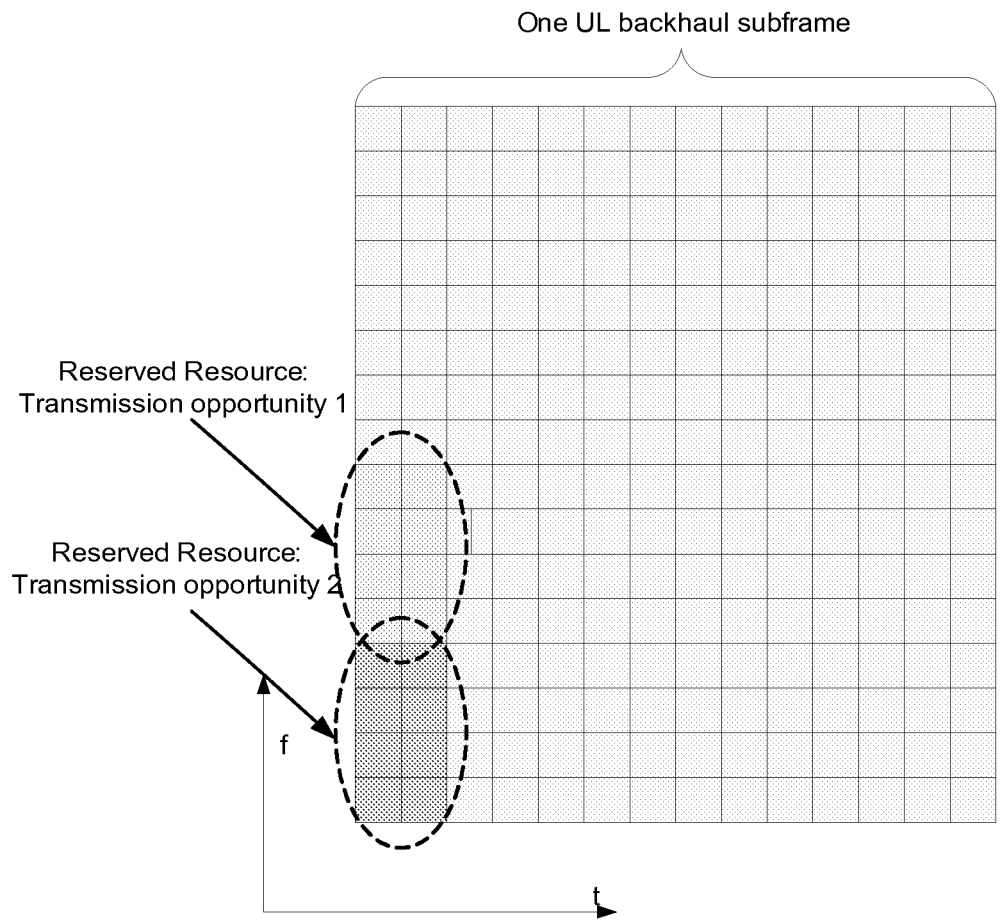
FIG. 4b illustrates an example backhaul sub-frame resource reservation according to an example embodiment of the present invention.
Figure 4C:
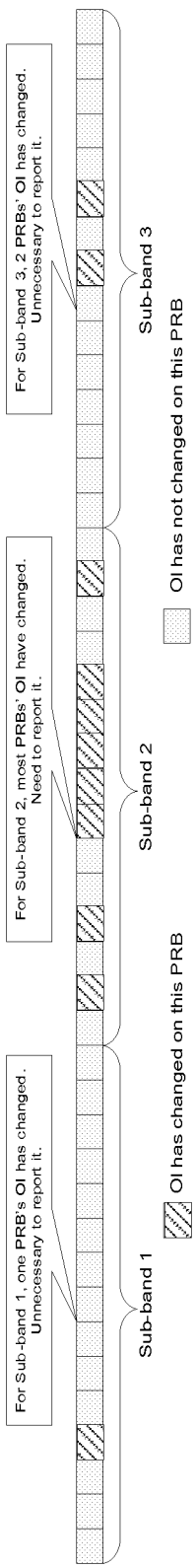
FIG. 4c illustrates an example sub-band division according to an example embodiment of the present invention.

To implement sub-band OI and HII reporting, the system bandwidth may be divided into multiple sub-bands and the donor cell may notify the relay nodes of the sub-band division via, for example radio resource control (RRC) signaling. The relay nodes may be configured to determine whether to report OI and/or HII information at 173 with respect to the sub-bands, rather than the entire bandwidth. Accordingly, thresholds for the number of changes to physical resource blocks within the sub-bands may be defined and the relay nodes may be configured to report OI and/or HII information when a sub-band threshold is exceeded. FIG. 4*c* illustrates an example sub-band division and associated physical resource block change analysis with respect to a threshold for each sub-band. Further, according to various example embodiments, each sub-band's OI or HII information may be reported to the donor cell separately, e.g. through different reserved transmission opportunities for respective sub-bands.

An additional benefit of sub-band division, according to various example embodiments, is a small payload size for OI and HII information, since only a portion of the bandwidth is being addressed by the OI or HII information. Thus, the reserved resources can be divided into an increased number of reserved resources or transmission opportunities. Further, in accordance with various example embodiments, as the number of available reserved resources or transmission opportunities increases, the likelihood of collisions decreases. Additionally, OI and HII information may be transmitted separately, which may further reduce the payload size. Example embodiments that employ separate messages for OI and HII may utilize one bit within the message to indicate the information type.

Figure 4D:
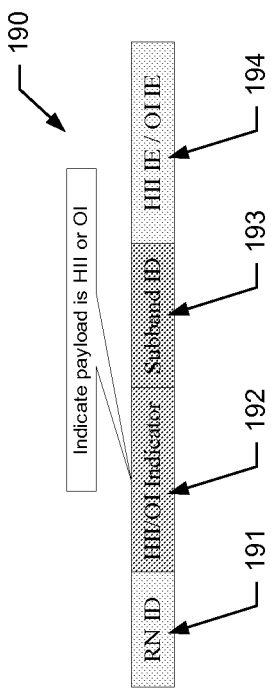
FIG. 4d illustrates a message format with sub-band identification according to an example embodiment of the present invention.

A message format configured for sub-band and separate OI and HII messaging is depicted in FIG. 4d. The message 190 includes a field for a relay node ID (RNID) 191. The HII/OI indicator 192 may be a one bit indicator for use to determine whether the payload of the message is OI or HII information. The sub-band ID 193 indicate which sub-band the OI or HII information is associated with, and the HII IE/OI IE field 194 may carry the HII information element or the OI information element.

In accordance with a third example scheme, which, as described above, may be combined with other schemes including the second example scheme, a periodic status pre-indication technique may be implemented over the UL backhaul link for relay node reporting. In this regard, a donor cell may allocate some dedicated resources to one or more relay nodes to transmit HII and/or OI information over the UL backhaul link. To assist the donor cell in determining which relay nodes should be allocated resources and report OI or HII information, the relay nodes may be configured to, for example periodically, transmit a pre-indication of the amount of changes that have occurred to the physical resource block's OI or HII. For example, one or two bit change indicators may be transmitted by the relay nodes. The donor cell may use information provided in the change indicators to determine when a relay node should be allocated resources for OI or HII information transmission and when to transmit the OI or HII information via the resources.

Figure 5A:
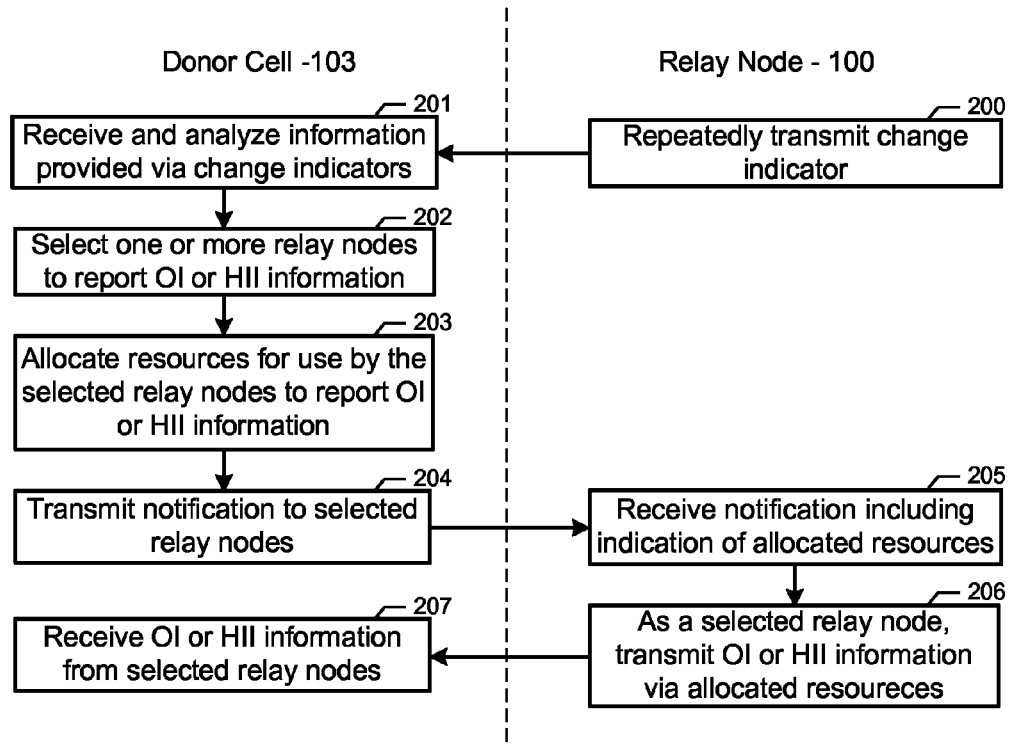
FIG. 5a illustrates a flow chart of a method for managing interference handling overhead according to an example embodiment of the present invention.

FIG. 5a illustrates a flowchart of an example method for implementing a periodic status pre-indication technique in accordance with example embodiments. At 200, one or more relay nodes repeatedly, and possibly periodically, transmit change indicators to a donor cell. As described above, the change indicators may be used to provide a donor cell a rough indication of the amount of change that has occurred to physical resource block's OI or HII associated with a relay node. The donor cell may receive the change indicators and analyze the information provided by the change indicators at 201. If the information provided in a change indicator for a particular relay node exceeds a threshold, the donor cell may select the particular relay node to report OI or HII information at 202. According to some example embodiments, the donor cell may select a number of relay nodes based on a threshold overhead burden on the UL backhaul link. The donor cell may allocate resources to the selected relay nodes to use in reporting OI or HII information at 203. At 204, the donor cell may transmit a notification to the selected relay nodes requesting the OI or HII information and indicating the allocated resources that are to be used for providing the OI or HII information. The notification may be provided via, for example, a physical downlink control channel between the donor cell and the relay node (R-PDCCH). Further, the notification may be provided in a next or subsequent DL backhaul sub-frame. A relay node may receive the notification including the indication of the allocated resources at 205. As a selected relay node, a relay node may transmit OI or HII information via the allocated resources to the donor cell at 206. The donor cell may in turn receive the OI or HII information from the selected relay node at 207.

Figure 5B:
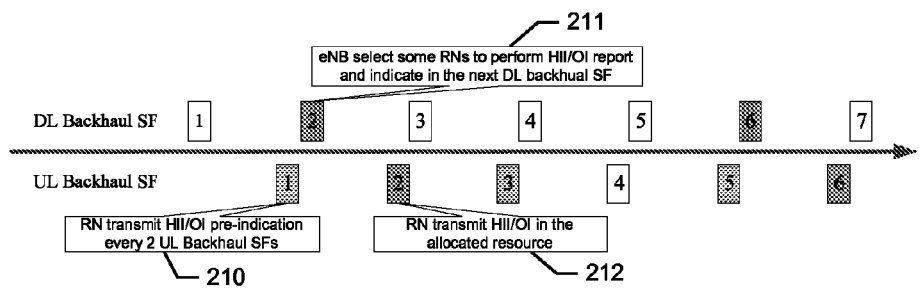
FIG. 5b illustrates a backhaul sub-frame flow according to an example embodiment of the present invention.

Further, the example method of FIG. 5a may also be described with respect to the backhaul sub-frame flow diagram of FIG. 5b. FIG. 5b depicts a representation of sequential sub-frames for the DL and UL backhaul link. At 210, a relay node provides a pre-indication change indicator repeatedly every two UL backhaul sub-frames. At 211, the donor cell (e.g., eNB) selects some relay nodes to perform a reporting of HII or IO information. The donor cell may also indicate the selection in the next DL backhaul sub-frame. At 212, the selected relay node transmits HII or OI information using the allocated resources.

An advantage of the pre-indication technique is that the relay node contributes to the donor cell's decisions to request the OI or HII via the repeated transmission of the change indicator. As a result, in accordance with some example embodiments, unnecessary reporting of OI or HII information is reduced. Further, in accordance with various example embodiments, the donor cell maintains control over the reporting and thereby can flexibly control the burden being placed on the backhaul interface.

In accordance with a fourth example scheme, separate transmission of HII information and OI information may be implemented on the DL and/or UL backhaul links. In this regard, UEs that are directly supported by the donor cell, or macro-UEs, may experience more interference than UEs supported by a relay node, or RN-UEs. To lower a macro-UE's experienced interference, the transmission of HII information over UL backhaul link and the transmission of OI information over the DL backhaul link may be beneficial. However, to lower a RN-UE's experienced interference, the transmission of HII information over the DL backhaul link and the transmission of OI information over UL backhaul link may be beneficial.

In accordance with various example embodiments, a relay node or donor cell may be configured to separately transmit HII information and OI information over both DL and UL backhaul links. For example, if only macro-UE experiences high interference, then only HII information is transmitted by the relay node over UL backhaul link, and only OI information is transmitted by the relay node over DL backhaul link. In the same manner, a donor cell may transmit HII information or OI information separately on either the DL and UL backhaul links. To determine which of the DL and UL backhauls links to utilize with either the OI information or the HII information, donor cells and relay nodes may analyze the OI information and the HII information associated with physical resource blocks allocated to a UE. In this way, a donor cell or relay node may determine the level of interference affecting a given UE In accordance with an example fifth scheme, a carrier aggregation technique may be implemented by the donor cell and the relay node. In this regard, in a LTE-A relay based system, carrier aggregation may be deployed at both the donor cells and the relay nodes. As a result, interference messaging may indicate, explicitly or implicitly, the component carrier associated with given HII information and OI information.

In accordance with various example embodiments, an additional information element may be included in a message, such as a load information message, that indicates which component carrier the corresponding HII information and/or OI information is associated with. The additional information element may be referred to as the "Frequency ID." The Frequency ID may be transmitted together with HII information and OI information via the X2 interface between neighbor eNBs or donor cells, or the backhaul interface between relay nodes and respective donor cells. Further, the eNBs may be configured to conduct additional interactions via X2 interface to determine which component carriers have been assigned to the neighboring cells controlled by relay nodes and cells controlled by eNBs or donor cells. Thus, in accordance with some example embodiments, an eNB or donor cell may be configured to report HII information and OI information on the specific carriers (e.g., the same component carriers being used in a neighboring cell).

Further, HII information and OI information for multiple carriers may be transmitted on one specific carrier over the DL and/or UL wireless backhaul link. In this regard, a Frequency ID information element may be transmitted with the HII information and/or the OI information over DL and/or UL wireless backhaul link. HII information and OI information, for each component carrier, may also be transmitted on each respective carrier over the DL and/or UL backhaul link. In this regard, the inclusion of the Frequency ID in the message with the HII information and/or the OI information may not be necessary since the component carrier may be implicitly determined.

In accordance with a sixth scheme, high levels of interference generated by the relay node on UL backhaul sub-frame may be considered. In this regard, a relay node may generate a relatively substantial amount of interference due to good link quality and high transmission power. To manage the interference generated by the relay node, the relay node may be configured to utilize sub-frames dedicated for UL backhaul transmission use by the relay node. In this manner, the interference generated by the relay node may occur during the dedicated sub-frames. Sub-frames not dedicated to the relay node may be utilized by the UEs, or for other purposes. The dedicated sub-frame configuration for UL backhaul link needs may be exchanged via the X2 interface between neighboring donor cells or eNBs. Further, UL backhaul sub-frame specific HII information and/or OI information, which is used to indicate the interference generated and/or experienced by the UL backhaul sub-frame, may also be implemented and/or exchanged through X2 interface between neighboring donor cells or eNBs.

Figure 6:
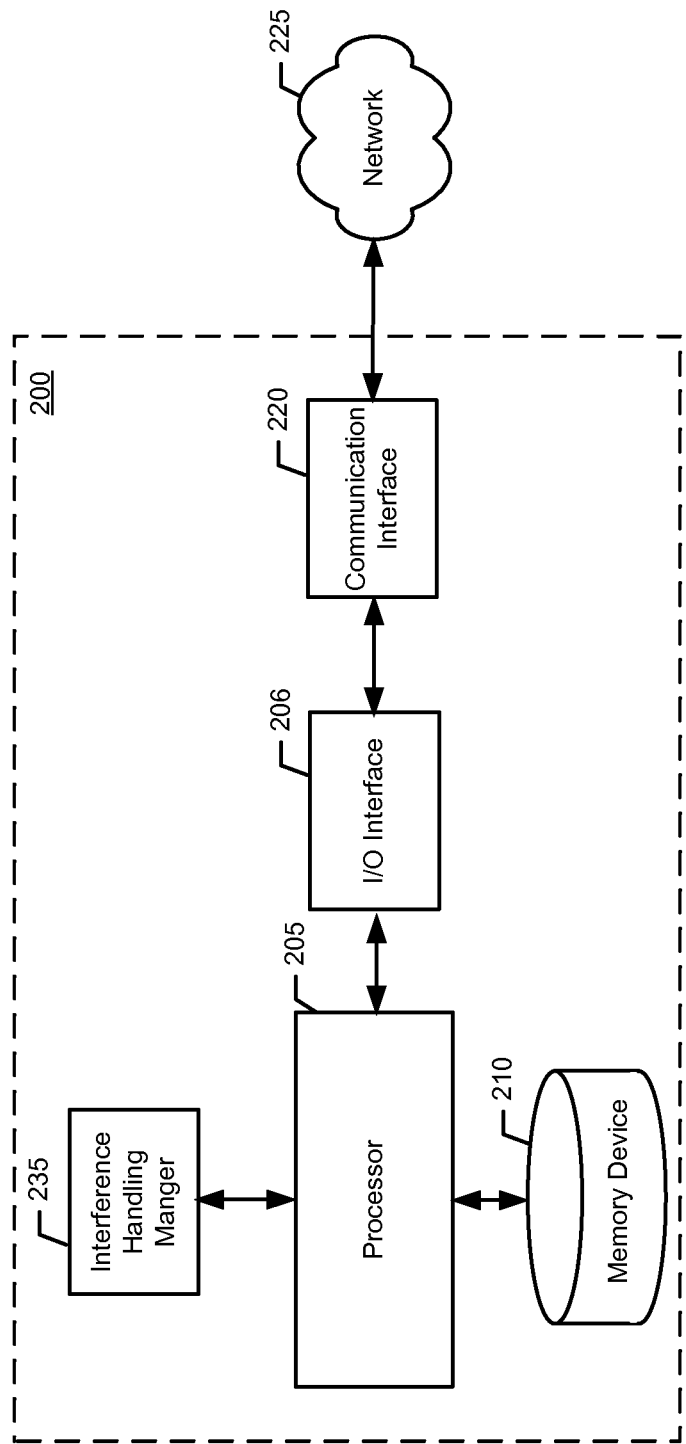
FIG. 6 illustrates a block diagram of an apparatus configured to manage interference handling overhead according to an example embodiment of the present invention.

The description provided above and generally herein illustrates example methods, example apparatuses, and example computer program products for managing interference handling overhead. FIG. 6 illustrates an example apparatus embodiment of the present invention configured to perform the various functionalities described herein. The apparatus 200, illustrated in FIG. 6, may be configured via the interference handling manager 235 to perform, or cause another apparatus to perform, the functionality described above with respect to the donor cell and/or the relay node. Additionally, the apparatus 200 is configured perform the various methods described herein including the methods depicted within and described with respect to the various figures.

Referring now to FIG. 6, in some example embodiments, the apparatus 200 may, be embodied as, or included as a component of, a communications device with wired or wireless communications capabilities. In this regard, the apparatus 200 may be configured to operate in accordance with the functionality of a donor cell or relay node as described herein. In some example embodiments, the apparatus 200 may be part of a communications device (e.g., access point 100 or UE 101), such as a stationary or a mobile terminal. As a stationary terminal, the apparatus 200 may be part of an access point (e.g., a base station, wireless router, or the like), a computer, a server, a device that supports network communications, or the like. As a mobile terminal, the apparatus 200 may be a mobile computer or mobile communications device. Regardless of the type of communications device, apparatus 200 may also include computing capabilities.

The example apparatus 200 includes or is otherwise in communication with a processor 205, a memory device 210, an Input/Output (I/O) interface 206, a communications interface 220, and an interference handling manager 235. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a server) configured for employing example embodiments of the present invention by further configuration of the processor 205 via executed instructions for performing the algorithms, methods, and operations described herein.

The memory device 210 may be one or more non-transitory computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 220. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 220 may be any device or means embodied in either hardware, a computer program product, or a combination of hardware and a computer program product that is configured to receive and/or transmit data from/to a network 225 and/or any other device or module in communication with the example apparatus 200. Processor 205 may also be configured to facilitate communications via the communications interface by, for example, controlling hardware included within the communications interface 220. In this regard, the communication interface 220 may include, for example, one or more antennas, a transmitter, a receiver, a transceiver and/or supporting hardware, including, for example, a processor for enabling communications. Via the communication interface 220, the example apparatus 200 may communicate with various other network entities in a device-to-device fashion and/or via indirect communications via a base station, access point, server, gateway, router, or the like. The communications interface 220 may also be configured to establish and maintain a backhaul interface and/or an X2 interface.

The communications interface 220 may be configured to provide for communications in accordance with any wired or wireless communication standard. The communications interface 220 may be configured to support communications in multiple antenna environments, such as multiple input multiple output (MIMO) environments. Further, the communications interface 220 may be configured to support orthogonal frequency division multiplexed (OFDM) signaling. In some example embodiments, the communications interface 220 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 220 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 220 may also be configured to support communications at the network layer, possibly via Internet Protocol (IP).

The interference handling manager 235 of example apparatus 200 may be any means or device embodied, partially or wholly, in hardware, a computer program product, or a combination of hardware and a computer program product, such as processor 205 implementing stored instructions to configure the example apparatus 200, or a hardware configured processor 205, that is configured to carry out the functions of the interference handling manager 235 as described herein. In an example embodiment, the processor 205 includes, or controls, the interference handling manager 235. The interference handling manager 235 may be, partially or wholly, embodied as processors similar to, but separate from processor 205. In this regard, the interference handling manager 235 may be in communication with the processor 205. In various example embodiments, the interference handling manager 235 may, partially or wholly, reside on differing apparatuses such that some or all of the functionality of the interference handling manager 235 may be performed by a first apparatus, and the remainder of the functionality of the interference handling manager 235 may be performed by one or more other apparatuses.

The apparatus 200 and the processor 205 may be configured to perform the functionality described herein via the interference handling manager 235. In this regard, the interference handling manager 235, in addition to being configured to perform the other functionality described with respect to the operation of the donor cell and relay node described herein, may be configured to generate or receive OI information and/or HII information and cause the OI information and/or to be transmitted in accordance with the various schemes and techniques described herein. The interference handling manager 235 may also be configured to generate messages in accordance with the various messaging formats and techniques described herein for transmission or receipt via the communications interface 220.

The various flowcharts and other support included herein describe example systems, methods, and/or computer program products according to example embodiments of the invention. It will be understood that each block or operation of the flowcharts and text, and/or combinations of blocks or operations in the flowcharts and text, can be implemented by various means. Means for implementing the blocks or operations of the flowcharts and text, combinations of the blocks or operations in the flowcharts and text, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as the processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' or text's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' or text's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' or text's block(s) or operation(s).

Accordingly, execution of instructions associated with the blocks or operations of the flowcharts or text by a processor, or storage of instructions associated with the blocks or operations of the flowcharts or text in a computer-readable storage medium, support combinations of operations for performing the specified functions. It will also be understood that one or more blocks or operations of the flowcharts or text, and combinations of blocks or operations in the flowcharts or text, may be implemented by special purpose hardware-based computer systems and/or processors which perform the specified functions, or combinations of special purpose hardware and program code instructions.

Additional example embodiments of the present invention are described as follows. An example method comprises generating interference overload indication information and causing the interference overload information to be transmitted on a broadcast channel for relay nodes, wherein the transmission via the broadcast channel indicates that the interference overload indication information is for a donor cell. An example apparatus comprises at least one processor and at least one memory including computer program code, the at least one memory and the computer program code configured to, with the at least one processor, cause the apparatus at least to perform generating interference overload indication information and causing the interference overload indication information to be transmitted on a broadcast channel for relay nodes, wherein the transmission via the broadcast channel indicates that the interference overload indication information is for a donor cell. A computer program product comprises at least one computer-readable storage medium having executable computer-readable program code instructions stored therein, the computer-readable program code instructions configured to cause an apparatus to perform generating interference overload indication information and causing the interference overload information to be transmitted on a broadcast channel for relay nodes, wherein the transmission via the broadcast channel indicates that the interference overload indication information is for a donor cell.

An example method comprises generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes. An example apparatus comprises at least one processor and at least one memory including computer program code, the at least one memory and the computer program code configured to, with the at least one processor, cause the apparatus at least to perform generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes. A computer program product comprises at least one computer-readable storage medium having executable computer-readable program code instructions stored therein, the computer-readable program code instructions configured to cause an apparatus to perform generating or receiving uplink high interference indication information, classifying subordinate relay nodes into groups, compressing the uplink high interference indication information associated with members of one of the groups, and causing the compressed uplink high interference indication information to be transmitted on a broadcast channel for relay nodes.

An example method comprises reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources. An example apparatus comprises at least one processor and at least one memory including computer program code, the at least one memory and the computer program code configured to, with the at least one processor, cause the apparatus at least to perform reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources. A computer program product comprises at least one computer-readable storage medium having executable computer-readable program code instructions stored therein, the computer-readable program code instructions configured to cause an apparatus to perform reserving resources for uplink high interference indication information or interference overload indication information transmissions, the reserved resources being allocated for use by a plurality of subordinate relay nodes without any one subordinate relay node being individually allocated the reserved resources, causing the subordinate relay nodes to be notified of the reserved resources, and receiving a transmission including uplink high interference indication information or interference overload indication information from at least one of the subordinate relay nodes via the reserved resources.

An example method comprises receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources. An example apparatus comprises at least one processor and at least one memory including computer program code, the at least one memory and the computer program code configured to, with the at least one processor, cause the apparatus at least to perform receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources. A computer program product comprises at least one computer-readable storage medium having executable computer-readable program code instructions stored therein, the computer-readable program code instructions configured to cause an apparatus to perform receiving a notification of resources reserved for uplink high interference indication information or interference overload indication information transmissions, the reserved resources being allocated for use by a plurality of subordinate relay nodes without any one subordinate relay node being individually allocated the reserved resources, and causing the transmission of uplink high interference indication information or interference overload indication information via at least one of the reserved resources.

An example method comprises receiving a repeatedly transmitted change indicator from a relay node, the change indicator representing a degree of change in uplink high interference indication information or interference overload indication information for physical resource blocks associated with a relay node, allocating resources to the relay node when the change indicator exceeds a threshold, and receiving uplink high interference indication information or interference overload indication information from the relay node via the allocated resources. An example apparatus comprises at least one processor and at least one memory including computer program code, the at least one memory and the computer program code configured to, with the at least one processor, cause the apparatus at least to perform receiving a repeatedly transmitted change indicator from a relay node, the change indicator representing a degree of change in uplink high interference indication information or interference overload indication information for physical resource blocks associated with a relay node, allocating resources to the relay node when the change indicator exceeds a threshold, and receiving uplink high interference indication information or interference overload indication information from the relay node via the allocated resources. A computer program product comprises at least one computer-readable storage medium having executable computer-readable program code instructions stored therein, the computer-readable program code instructions configured to cause an apparatus to perform receiving a repeatedly transmitted change indicator from a relay node, the change indicator representing a degree of change in uplink high interference indication information or interference overload indication information for physical resource blocks associated with a relay node, allocating resources to the relay node when the change indicator exceeds a threshold, and receiving uplink high interference indication information or interference overload indication information from the relay node via the allocated resources.

An example method comprises causing a repeated transmission of a change indicator, the change indicator representing a degree of change in uplink high interference indication information or interference overload indication information for physical resource blocks associated with a relay node, receiving a notification of allocated resources in response to the change indicator having exceeded a threshold, and causing transmission of uplink high interference indication information or interference overload indication information via the allocated resources. An example apparatus comprises at least one processor and at least one memory including computer program code, the at least one memory and the computer program code configured to, with the at least one processor, cause the apparatus at least to perform causing a repeated transmission of a change indicator, the change indicator representing a degree of change in uplink high interference indication information or interference overload indication information for physical resource blocks associated with a relay node, receiving a notification of allocated resources in response to the change indicator having exceeded a threshold, and causing transmission of uplink high interference indication information or interference overload indication information via the allocated resources. A computer program product comprises at least one computer-readable storage medium having executable computer-readable program code instructions stored therein, the computer-readable program code instructions configured to cause an apparatus to perform causing a repeated transmission of a change indicator, the change indicator representing a degree of change in uplink high interference indication information or interference overload indication information for physical resource blocks associated with a relay node, receiving a notification of allocated resources in response to the change indicator having exceeded a threshold, and causing transmission of uplink high interference indication information or interference overload indication information via the allocated resources.

An example method comprises causing the transmission of uplink high interference indication information on one of a downlink backhaul link or an uplink backhaul link, and causing the transmission of interference overload indication information on the other one of the downlink backhaul link or the uplink backhaul link. An example apparatus comprises at least one processor and at least one memory including computer program code, the at least one memory and the computer program code configured to, with the at least one processor, cause the apparatus at least to perform causing the transmission of uplink high interference indication information on one of a downlink backhaul link or an uplink backhaul link, and causing the transmission of interference overload indication information on the other one of the downlink backhaul link or the uplink backhaul link. A computer program product comprises at least one computer-readable storage medium having executable computer-readable program code instructions stored therein, the computer-readable program code instructions configured to cause an apparatus to perform causing the transmission of uplink high interference indication information on one of a downlink backhaul link or an uplink backhaul link, and causing the transmission of interference overload indication information on the other one of the downlink backhaul link or the uplink backhaul link.

An example method comprises generating a message including uplink high interference indication information or interference overload indication information, the message including an indication of, or otherwise indicating, a component carrier associated with the uplink high interference indication information or interference overload indication information, and causing transmission of the generated message. An example apparatus comprises at least one processor and at least one memory including computer program code, the at least one memory and the computer program code configured to, with the at least one processor, cause the apparatus at least to perform generating a message including uplink high interference indication information or interference overload indication information, the message including an indication of, or otherwise indicating, a component carrier associated with the uplink high interference indication information or interference overload indication information, and causing transmission of the generated message. A computer program product comprises at least one computer-readable storage medium having executable computer-readable program code instructions stored therein, the computer-readable program code instructions configured to cause an apparatus to perform generating a message including uplink high interference indication information or interference overload indication information, the message including an indication of, or otherwise indicating, a component carrier associated with the uplink high interference indication information or interference overload indication information, and causing transmission of the generated message.

An example method comprises receiving an indication of sub-frames dedicated for uplink backhaul transmissions by a relay node; and causing transmissions by the relay node within the dedicated sub-frames. An example apparatus comprises at least one processor and at least one memory including computer program code, the at least one memory and the computer program code configured to, with the at least one processor, cause the apparatus at least to perform receiving an indication of sub-frames dedicated for uplink backhaul transmissions by a relay node; and causing transmissions by the relay node within the dedicated sub-frames. A computer program product comprises at least one computer-readable storage medium having executable computer-readable program code instructions stored therein, the computer-readable program code instructions configured to cause an apparatus to perform receiving an indication of sub-frames dedicated for uplink backhaul transmissions by a relay node; and causing transmissions by the relay node within the dedicated sub-frames.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   generating, using a processor, interference overload indication information, wherein generating interference overload indication information includes generating interference overload indication information at a donor cell; and
   causing the interference overload indication information to be transmitted on a broadcast channel for relay nodes, wherein the transmission via the broadcast channel indicates that the interference overload indication information is for the donor cell without the interference overload indication information comprising an identifier of the donor cell, wherein the donor cell supports at least one relay node by establishing a backhaul interface with the respective relay node.

2. The method of claim 1, wherein generating interference overload indication information includes generating interference overload information, the interference overload information indicating an inter-cell interference level experienced by the donor cell.

3. The method of claim 1, wherein causing the interference overload information to be transmitted on the broadcast channel for relay nodes includes causing the interference overload information to be transmitted on relay node control channel of the backhaul interface.

4. The method of claim 1, wherein causing the interference overload information to be transmitted on the broadcast channel for relay nodes includes causing the interference overload information to be transmitted in a predefined backhaul link sub-frame.

5. The method of claim 1, wherein causing the interference overload information to be transmitted on the broadcast channel for relay nodes includes causing the interference overload information to be transmitted on a relay-physical broadcasting channel (R-PBCH) between a relay node and the donor cell.

6. An apparatus comprising at least one processor and at least one memory including computer program code, the at least one memory and the computer program code configured to, with the at least one processor, direct the apparatus at least to:
   generate interference overload indication information, wherein generating interference overload indication information includes generating interference overload indication information at a donor cell; and
   cause the interference overload indication information to be transmitted on a broadcast channel for relay nodes, wherein the transmission via the broadcast channel indicates that the interference overload indication information is for the donor cell without the interference overload indication information comprising an identifier of the donor cell, wherein the donor cell supports at least one relay node by establishing a backhaul interface with the respective relay node.

7. The apparatus of claim 6, wherein the apparatus directed to generate interference overload indication information includes being directed to generate interference overload information, the interference overload information indicating an inter-cell interference level experienced by the donor cell.

8. The apparatus of claim 6, wherein the apparatus directed to cause the interference overload information to be transmitted on the broadcast channel for relay nodes includes being directed to cause the interference overload information to be transmitted on relay node control channel of the backhaul interface.

9. The apparatus of claim 6, wherein the apparatus directed to cause the interference overload information to be transmitted on the broadcast channel for relay nodes includes being directed to cause the interference overload information to be transmitted in a predefined backhaul link sub-frame.

10. The apparatus of claim 6, wherein the apparatus directed to cause the interference overload information to be transmitted on the broadcast channel for relay nodes includes being directed to cause the interference overload information to be transmitted on a relay-physical broadcasting channel (R-PBCH) between a relay node and the donor cell.

11. A computer program product comprising at least one non-transitory computer-readable storage medium having executable computer-readable program code instructions stored therein, the computer-readable program code instructions being configured to:
generate interference overload indication information, wherein generating interference overload indication information includes generating interference overload indication information at a donor cell; and
cause the interference overload indication information to be transmitted on a broadcast channel for relay nodes, wherein the transmission via the broadcast channel indicates that the interference overload indication information is for the donor cell without the interference overload indication information comprising an identifier of the donor cell, wherein the donor cell supports at least one relay node by establishing a backhaul interface with the respective relay node.

12. The computer program product of claim 11, wherein the computer-readable program code instructions are configured to generate interference overload indication information are further configured to direct the apparatus to generate interference overload information, the interference overload information indicating an inter-cell interference level experienced by the donor cell.

13. The computer program product of claim 11, wherein the computer-readable program code instructions are configured to cause the interference overload information to be transmitted on the broadcast channel for relay nodes are further configured to direct the apparatus to cause the interference overload information to be transmitted on relay node control channel of the backhaul interface.

14. The computer program product of claim 11, wherein the computer-readable program code instructions are configured to cause the interference overload information to be transmitted on the broadcast channel for relay nodes are further configured to direct the apparatus to cause the interference overload information to be transmitted in a predefined backhaul link sub-frame.

15. The computer program product of claim 11, wherein the computer-readable program code instructions are configured to cause the interference overload information to be transmitted on the broadcast channel for relay nodes are further configured to direct the apparatus to cause the interference overload information to be transmitted on a relay-physical broadcasting channel (R-PBCH) between a relay node and the donor cell.

* * * * *